US009019077B2

(12) United States Patent
Hazzani (10) Patent No.: US 9,019,077 B2
(45) Date of Patent: Apr. 28, 2015

(54) SYSTEM AND METHOD FOR PREDICTING FUTURE MEETINGS OF WIRELESS USERS

(75) Inventor: Gideon Hazzani, Rishon le Zion (IL)

(73) Assignee: Verint Systems Ltd., Herzelia, Pituach (IL)

( * ) Notice: Subject to any disclaimer, the term of this patent is extended or adjusted under 35 U.S.C. 154(b) by 59 days.

(21) Appl. No.: 12/708,558

(22) Filed: Feb. 19, 2010

(65) Prior Publication Data

US 2010/0214117 A1    Aug. 26, 2010

(30) Foreign Application Priority Data

Feb. 22, 2009 (IL) .......................... 197168

(51) Int. Cl.
*G08B 5/22* (2006.01)
*H04W 4/02* (2009.01)
*H04L 29/08* (2006.01)

(52) U.S. Cl.
CPC ................ *H04W 4/02* (2013.01); *H04W 4/021* (2013.01); *H04W 4/023* (2013.01); *H04W 4/027* (2013.01); *H04W 4/028* (2013.01); *H04L 67/306* (2013.01); *H04L 67/18* (2013.01)

(58) Field of Classification Search
USPC ................ 340/3.1, 3.3, 3.32, 3.4, 3.41, 8.1, 340/FOR. 437; 342/450–465; 455/456.1–463, 404.2, 440–441; 701/200–205, 210, 214, 217, 302; 706/21
See application file for complete search history.

(56) References Cited

U.S. PATENT DOCUMENTS

| 5,325,302 | A | * | 6/1994 | Izidon et al. | 701/301 |
| 5,572,221 | A | * | 11/1996 | Marlevi et al. | 342/452 |
| 5,724,040 | A | * | 3/1998 | Watnick | 342/26 D |
| 5,867,804 | A | * | 2/1999 | Pilley et al. | 701/120 |
| 6,119,006 | A | * | 9/2000 | Shaffer et al. | 455/440 |
| 6,553,232 | B1 | * | 4/2003 | Shaffer et al. | 455/440 |
| 7,103,370 | B1 | * | 9/2006 | Creemer | 455/456.3 |
| 7,689,521 | B2 | * | 3/2010 | Nodelman et al. | 706/21 |
| 7,720,844 | B2 | * | 5/2010 | Chu et al. | 707/724 |
| 7,739,210 | B2 | * | 6/2010 | Horvitz et al. | 706/21 |

(Continued)

FOREIGN PATENT DOCUMENTS

| EP | 1260791 A1 | 11/2002 |
| GB | 2445003 A | 6/2008 |

(Continued)

OTHER PUBLICATIONS

Extended European Search Report for EP Application No. 10250289.5, dated Jul. 7, 2010.

(Continued)

*Primary Examiner* — Julie Lieu
*Assistant Examiner* — Stephen Burgdorf
(74) *Attorney, Agent, or Firm* — Meunier Carlin & Curfman (57) ABSTRACT

Methods and system for predicting a future location of users of wireless communications terminals. Location information indicating respective locations of multiple wireless communication terminals may be received and processed so as to predict a future meeting among respective users of the wireless communication terminals. An action may be taken with respect to the predicted future meeting. The location information may be received from a wireless communication network to obtain a Point-of-Interest (POI) that is related to one or more of the users from a characteristic location profile of the one or more users. The POI may be indicated as the likely location of the future meeting.

9 Claims, 4 Drawing Sheets

(56) References Cited

U.S. PATENT DOCUMENTS

| | | | |
|---|---|---|---|
| 7,941,133 B2* | 5/2011 | Aaron et al. | 455/418 |
| 8,031,595 B2* | 10/2011 | Hamilton et al. | 370/230 |
| 8,290,479 B2* | 10/2012 | Aaron et al. | 455/418 |
| 2001/0010541 A1* | 8/2001 | Fernandez et al. | 348/143 |
| 2002/0022927 A1* | 2/2002 | Lemelson et al. | 701/301 |
| 2003/0004776 A1* | 1/2003 | Perrella et al. | 705/9 |
| 2003/0027558 A1* | 2/2003 | Eisinger | 455/414 |
| 2003/0137419 A1* | 7/2003 | Gehlot et al. | 340/572.1 |
| 2003/0140060 A1* | 7/2003 | Gehlot et al. | 707/104.1 |
| 2003/0217073 A1* | 11/2003 | Walther et al. | 707/104.1 |
| 2004/0030571 A1* | 2/2004 | Solomon | 705/1 |
| 2004/0039579 A1 | 2/2004 | Chithambaram et al. | |
| 2004/0249776 A1* | 12/2004 | Horvitz et al. | 706/21 |
| 2005/0079877 A1* | 4/2005 | Ichimura | 455/456.1 |
| 2005/0101335 A1* | 5/2005 | Kelly et al. | 455/456.3 |
| 2006/0069501 A1* | 3/2006 | Jung et al. | 701/209 |
| 2006/0227047 A1* | 10/2006 | Rosenberg | 342/357.13 |
| 2007/0071209 A1* | 3/2007 | Horvitz et al. | 379/201.06 |
| 2007/0149214 A1* | 6/2007 | Walsh et al. | 455/456.1 |
| 2008/0195312 A1 | 8/2008 | Aaron et al. | |
| 2009/0197619 A1* | 8/2009 | Colligan et al. | 455/456.3 |
| 2010/0185605 A1* | 7/2010 | Chu et al. | 707/722 |

FOREIGN PATENT DOCUMENTS

| | | |
|---|---|---|
| WO | 2007070505 A2 | 6/2007 |
| WO | 2008012175 A1 | 1/2008 |
| WO | 2009101629 A2 | 8/2009 |
| WO | 2010116292 A2 | 10/2010 |

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.

Asokan, N., et al., "Man-in-the-Middle in Tunneled Authentication Protocols," Draft version 1.3 (latest public version: http://eprint.iacr.org/2002/163/, Nov. 11, 2002, 15 pages.

Strobel, Daehyun, "IMSI Catcher," Seminararbeit Ruhr-Universität Bochum, Chair for Communication Security, Prof. Dr.-Ing. Christof Paar, Jul. 13, 2007, 28 pages.

Meyer, Ulrike, et al., "On the Impact of GSM Encryption and Man-in-the-Middle Attacks on the Security of Interoperating GSM/UMTS Networks," IEEE, 2004, 8 pages, Mar. 4, 2004.

* cited by examiner

$$\vec{Y_i}(t_0, \tau) = \vec{X_i}(t_0) + \tau \cdot \vec{V_i}(t_0)$$

FIG. 5

SYSTEM AND METHOD FOR PREDICTING FUTURE MEETINGS OF WIRELESS USERS

FIELD OF THE DISCLOSURE

The present disclosure relates generally to location tracking.

BACKGROUND OF THE DISCLOSURE

Mobile communication networks deploy various techniques for measuring the geographical locations of wireless communication terminals. Such techniques are used, for example, for surveillance purposes and for providing Location Based Services (LBS) and emergency services. Some location tracking techniques are passive and monitor events generated in the wireless network. Other techniques are active, i.e., proactively request the network or the terminal to provide location information.

SUMMARY OF THE DISCLOSURE

An embodiment that is described herein provides a method, including:

receiving location information indicating respective locations of multiple wireless communication terminals;

processing the location information so as to predict a future meeting among respective users of the wireless communication terminals; and taking action with respect to the predicted future meeting.

In some embodiments, receiving the location information includes receiving location measurements from a wireless communication network with which the wireless communication terminals communicate. The wireless communication network may include at least one network type selected from a group of types consisting of a Universal Mobile Telecommunication System (UMTS) network, a CDMA2000 network, a Global System for Mobile communication (GSM) network, an Integrated Digital Enhanced Network (IDEN) network and a WiMAX network.

In a disclosed embodiment, processing the location information includes calculating a likely location of the future meeting. Calculating the likely location may include obtaining a Point-of-Interest (POI) related to one or more of the users from a characteristic location profile of the one or more users, and indicating the POI as the likely location of the future meeting.

In an embodiment, processing the location information includes predicting an occurrence time of the future meeting. Additionally or alternatively, processing the location information includes calculating an occurrence likelihood of the future meeting. The occurrence likelihood may include an occurrence probability of the future meeting. Taking the action may include presenting data regarding the future meeting to an operator. Additionally or alternatively, taking the action may include activating an alarm.

In some embodiments, the wireless communication terminals are associated with one or more groups-of-interest, and processing the location information includes predicting the future meeting among at least some of the terminals that are associated with one of the groups-of-interest. Processing the location information may include predicting that future location coordinates of the respective wireless communication terminals are expected to converge to a given region, and predicting the future meeting responsively to the future location coordinates. In an embodiment, processing the location information includes predicting that the future location coordinates are expected to converge responsively to respective estimated velocities of the wireless communication terminals. In another embodiment, processing the location information includes predicting that the future location coordinates are expected to converge responsively to respective estimated directions of movement of the wireless communication terminals.

There is additionally provided, in accordance with an embodiment of the present invention, apparatus, including:

an interface, which is operative to communicate with a wireless communication network; and a processor, which is coupled to receive location information indicating respective locations of multiple wireless communication terminals, to process the location information so as to predict a future meeting among respective users of the wireless communication terminals, and to take action with respect to the predicted future meeting.

The present disclosure will be more fully understood from the following detailed description of the embodiments thereof, taken together with the drawings in which:

DETAILED DESCRIPTION OF EMBODIMENTS

Overview

Many wireless communication systems, such as cellular networks, track the geographic locations of some or all of their users, and produce location information indicating the current location of the tracked users. Embodiments that are described herein provide methods and systems for utilizing the location information for predicting future meetings of wireless users belonging to groups of interest, and for indicating potential locations for the predicted meetings. The ability to predict meetings can be useful for various applications. For example, government and law enforcement agencies can predict potential meetings of individuals under surveillance, and invoke appropriate responsive measures. As another example, Location-Based Services (LBS) operators can adjust their services according to the likelihood of future meeting locations.

System Description

Figure 1:
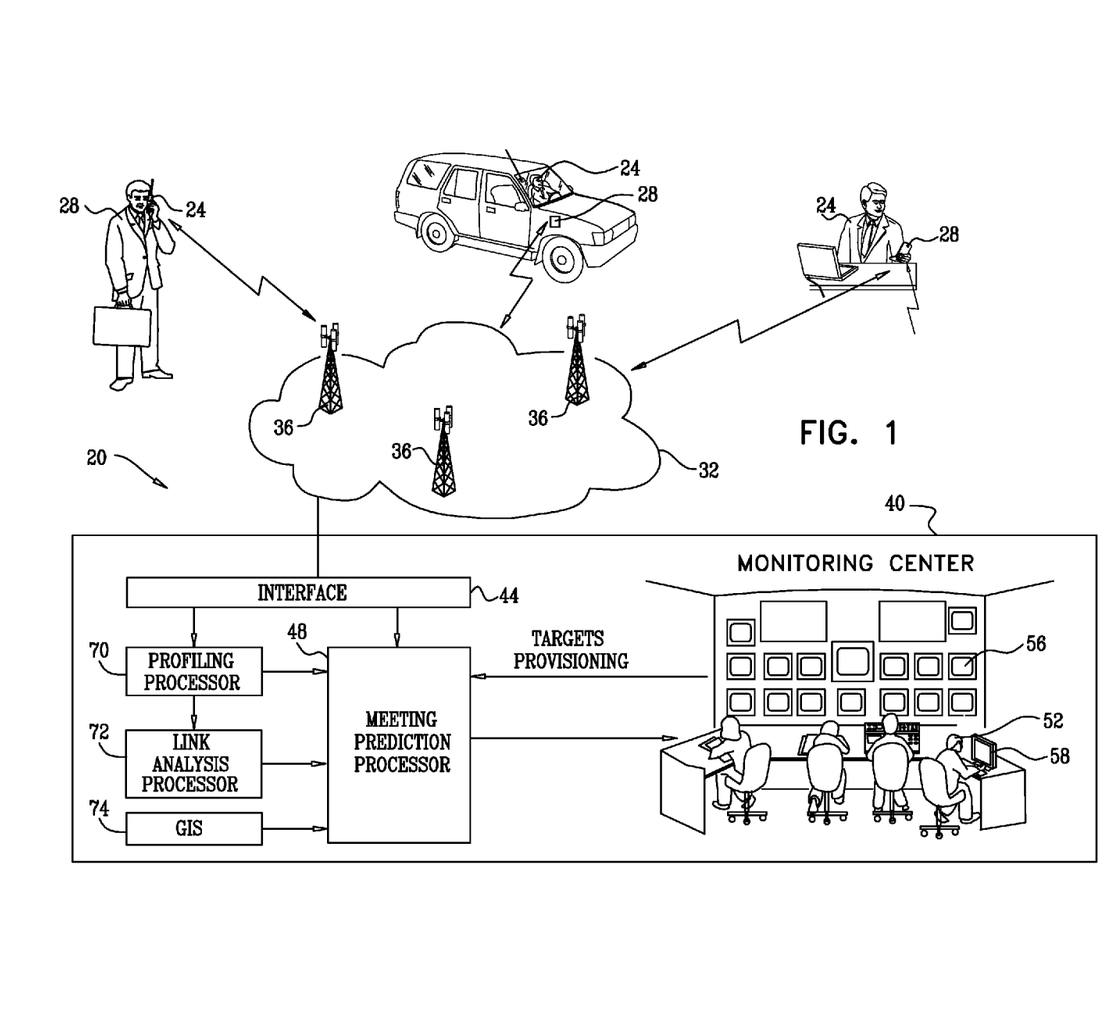
FIG. 1 is a schematic, pictorial illustration of a system for predicting meetings of wireless users, in accordance with an embodiment that is described herein.

FIG. 1 is a schematic, pictorial illustration of a system 20 for predicting future meetings of wireless users, in accordance with an embodiment that is described herein. In system 20, users 24 operate wireless communication terminals 28 to communicate with a wireless communication network 32. Terminals 28 typically communicate with base-stations 36 in network 32. Terminals 28 may comprise, for example, cellular phones, wireless-enabled Personal Digital Assistants (PDA) or mobile computers, or any other suitable type of communication or computing terminal having wireless communication capabilities.

Network 32 may comprise any suitable wireless communication network. The network may comprise, for example, a cellular network operating in accordance with any suitable cellular standard or protocol, such as a Universal Mobile Telecommunication System (UMTS) network, CDMA2000 network or other third generation (3G) cellular network, a Global System for Mobile communication (GSM) network or an Integrated Digital Enhanced Network (IDEN) network. Alternatively, network 32 may comprise a WiMAX network operating in accordance with the IEEE 802.16 standards or other wireless data network.

Network 32 tracks the locations of some or all of terminals 28, and produces location information indicating the locations of the tracked terminals. Various techniques for tracking the locations of wireless communication terminals are known in the art, and network 32 may employ any suitable technique for this purpose.

Some location tracking techniques, referred to as network-based techniques, are carried out by the base stations and other network-side components of network 32, without necessarily using special hardware or software at the mobile terminal side. For example, Cell Identification (CID) techniques, also sometimes referred to as Cell Global Identity (CGI) techniques, locate the wireless terminal by identifying the cell via which the terminal currently communicates. Enhanced CID (E-CID, also referred to as E-CGI) techniques combine CID information with timing information, which is indicative of the distance between the terminal and the base station. In UMTS networks, for example, the timing information may comprise Round-Trip Time (RTT) values. In GSM applications, timing information may comprise Time Advance (TA) values.

Another network-based location technique, called Uplink Time Difference of Arrival (U-TDOA), determines the terminal's position by calculating the difference in time required for a transmission sent by the terminal to reach different base station sites. The arrival time measurements are made by Location Measurement Units (LMUs) installed at selected base station sites. Yet another technique, referred to as Angle of Arrival (AOA), determines the user position by establishing lines of bearing from base station sites to the user.

Other location tracking techniques are terminal-based, i.e., use special hardware or software in the mobile terminal. For example, some techniques use measurements performed by a Global Positioning System (GPS) receiver installed in the communication terminal. In Assisted GPS (A-GPS) techniques, the GPS measurements are assisted by an assistance server external to the mobile terminal. The assistance server is sometimes equipped with another GPS receiver, whose position is known a-priori. Another terminal-based technique is Enhanced Observed Time Difference (E-OTD), in which the terminal measures the time differences between signal arrivals from different base stations. A similar terminal-based technique is called Enhanced Forward Link Trilateration (EFLT).

The location tracking techniques deployed in network 32 may be passive or active. Passive techniques perform unobtrusive probing of the signaling information transmitted in the network, and extract location information from the monitored signaling. Active techniques, on the other hand, proactively request the network or the terminal to provide location information.

System 20 comprises a monitoring center 40, which exploits the location information produced by network 32 to predict future meetings between users 24, using methods that are described below. In some embodiments, the monitoring center calculates the likelihood of a future meeting of a group of users 24, and indicates one or more probable locations for the predicted meeting.

Strictly speaking, network 32 provides location information related to the terminals 28 while the operator of the monitoring center is actually interested in the location of the users 24. In practice, a given terminal is usually collocated with its user, and therefore the monitoring system assumes that the location of the terminal is, with high probability, indicative of that of the user. Consequently, the terms "terminal" and "user" are used interchangeably herein. Users 24 and terminals 28 are also referred to herein as "targets" or "wireless targets".

Monitoring center 40 may be operated, for example, by a government or law enforcement agency for predicting potential meetings of members of a group of individuals under surveillance. Alternatively, monitoring center 40 may be used by Location-Based Services (LBS) operators to adjust a given service to probable meeting locations.

Monitoring center 40 comprises an interface 44 for communicating with network 32, and a meeting prediction processor 48, which carries out the prediction methods described herein. The occurrence likelihood of the predicted meetings and their potential locations are typically presented to one or more operators 52 of the monitoring center, such as using displays 56 or other suitable output devices.

Monitoring center 40 may also comprise a profiling processor 70, a link analysis processor 72 and a Geographic Information System (GIS) 74. Profiling processor 70 typically analyzes the location information received from network 32 and builds target location profiles comprising characteristic periodic location and movement patterns of the targets. The target location profiles are typically presented to operator 52. The target location profiles may also serve as additional input to meeting predicting processor 48. In particular, profiling processor 70 may identify one or more characteristic Points Of Interest (POIs), possibly obtained from GIS 74, that are frequented by a given target. Such POIs can sometimes be identified as possible meeting locations, as will be described below. In some embodiments, potential POIs can be obtained for characteristic location profiles of the targets in questions.

Link analysis processor 72 typically analyzes communication traffic in network 32, and identifies relationships among different targets. The relationships identified by processor 72 may be used for determining groups of targets, whose meetings are of interest. In some embodiments, processor 48 predicts meetings among targets, which belong to groups that have been identified by processor 72. Alternatively, target groups can be identified or specified using any other suitable process.

Although FIG. 1 presents meeting prediction processor 48 as a single processor dedicated to prediction of future meetings, other configurations may also be implemented. For example, in some embodiments, more than one processor may perform the task of meeting prediction. Additionally or alternatively, the same processor or processors that carry out the meeting prediction task may also perform additional tasks, such as target profiling, link analysis, GIS, or other tasks.

Monitoring center 40 may reside in a single site, as illustrated in FIG. 1. Alternatively, multi-site embodiments, in which the tasks of monitoring center 40 are distributed over several sites, may also be implemented.

The operation of meeting prediction processor 48 is typically subject to qualification data provided to the processor. The qualification data typically comprises groups of targets, referred to as "groups of interest." A group of interest is defined by a list of its members, and may also be associated with additional qualification data, such as POIs and responsive actions (i.e., actions that are performed when a possible meeting is predicted). The groups of interest are not necessarily mutually exclusive, meaning that a target may belong to more than one group. The groups of interest also need not be exhaustive, i.e., the members of those groups are usually only a relatively small subset of all wireless users.

The target provisioning and qualification data governing the operation of meeting prediction processor 48 can be predefined within the processor. Additionally or alternatively, the qualification data can be provided by operators 52, for example via Man-Machine Interface (MMI) devices such as consoles 58, or by other computerized systems, for example by link analysis processor 72. The consoles and/or the other computerized systems may be located either at the monitoring center or at some remote location.

Typically, processor 48 comprises a general-purpose computer, which is programmed in software to carry out the functions described herein. The software may be downloaded to the computer in electronic form, for example over a network. Alternatively or additionally, the software may be provided and/or stored on tangible media, such as a magnetic, optical or electronic memory. In some embodiments, the functions of processor 48 are integrated with other functions of the monitoring center on one or more computing platforms.

For the sake of clarity, the embodiment of FIG. 1 refers to a single communication network 32. In alternative embodiments, however, monitoring center 40 may accept location information from multiple wireless networks. The monitoring center may accept location information for a given target at a given time from multiple networks, such as when the target operates a multi-mode terminal or multiple terminals in different networks. The monitoring center may also accept location information for a given target at different times from different networks, such as when the target roams between different networks.

Meeting Prediction Processor

In a typical embodiment, network 32 provides the location information in the form of location records. Each location record typically comprises an identity number identifying the wireless terminal, and a vector having two or three dimensions, which indicates the current geographic location of the terminal. The location records are usually received by meeting prediction processor 48 shortly after they have been produced by network 32, the typical delay being on the order of several seconds. A field indicating the Time-Of-Day (TOD) of the location information is typically attached to each record. The TOD field is sometimes provided by network 32, but can also be created by processor 48 assuming a relatively short delay in receiving the records. The resolution of the TOD field is usually on the order of seconds. The time gap between consecutive records is usually on the order of several seconds to several minutes, depending on, for example, the location tracking techniques employed by the network and the mobility of the targets.

Figure 2:
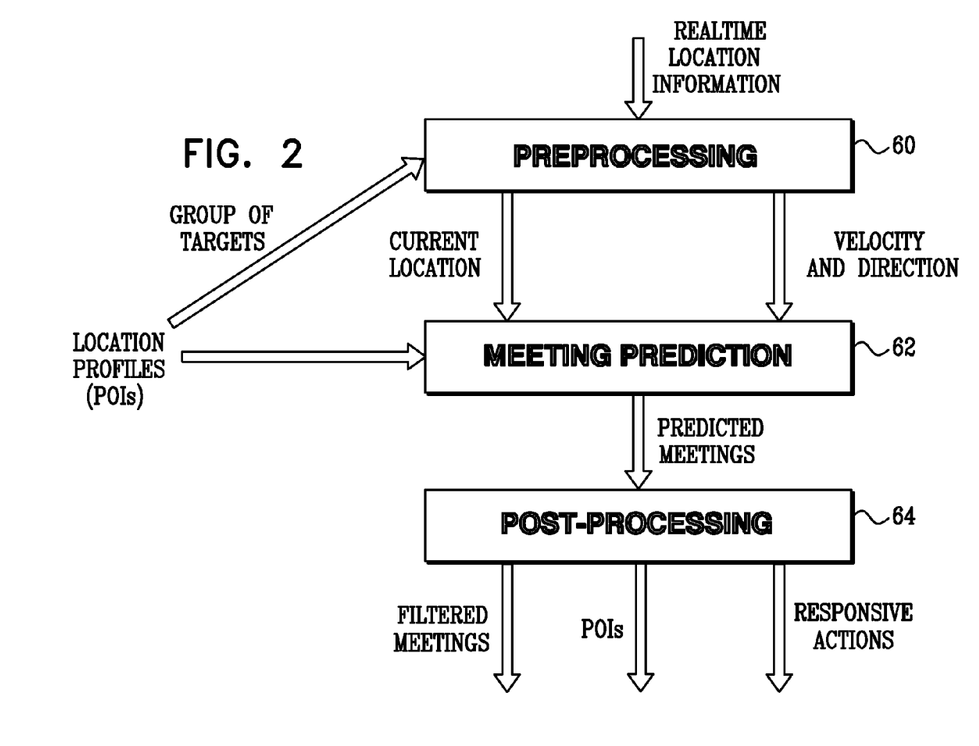
FIG. 2 is a flow chart that schematically illustrates a process for predicting meetings of wireless users, in accordance with an embodiment that is described herein.

FIG. 2 is a flow chart that schematically illustrates a process for predicting future meetings between users 24, in accordance with an embodiment that is described herein. The process of FIG. 2 is conceptually partitioned into a preprocessing phase 60, a meeting prediction phase 62 and a post-processing phase 64. Preprocessing phase 60 usually comprises analyzing the location records received from the wireless network and preparing them for efficient processing at meeting prediction phase 62. Typical outputs of preprocessing phase 60 are the current location, and possibly also velocity and direction, of each wireless target.

Meeting prediction phase 62 typically comprises calculating the likelihood of a future meeting among members of a group of interest and indicating probable places for the predicted meetings, based on the data received from preprocessing phase 60. In some embodiments, the predictions performed at the meeting prediction phase utilize POIs that are obtained from location profiles received from profiling processor 70.

Usually, post-processing phase 64 prepares the output of meeting prediction phase 62 for presentation to the operator. Post-processing typically comprises filtering the predicted meetings, correlating probable meeting locations with POIs, and triggering responsive actions such as activating alarms.

Pre-Processing

In pre-processing phase 60, meeting prediction processor 48 gathers the location records related to each wireless target, analyzes them, and produces, for each wireless target, current location data and movement data. The location data typically comprises a two- or three-dimensional vector representing the two or three Cartesian coordinates of the target. Movement data can be represented, for example, in a two- or three-dimensional vector representing the momentary velocity of the target in the Cartesians axes. Alternatively, movement data can be represented in polar format, i.e., in terms of the absolute instantaneous velocity of the target and its instantaneous direction of movement. Additionally or alternatively, processor 48 may produce any other output that is suitable for processing at meeting predicting phase 62.

A first output of preprocessing phase 60 comprises current location data, typically comprising an estimate of the current geographic location of the targets. The current location data may also comprise an indication of the reliability and accuracy of the estimated locations. The current location data is the primary input of meeting prediction phase 62.

At preprocessing phase 60, processor 48 may also produce current movement data, e.g., estimates of the direction and velocity of the targets. The current movement data may also comprise an indication of the reliability and accuracy of the estimated direction and velocity. The current movement data may be used at preprocessing phase 60 to enhance the current location data. The current movement data may also serve as additional input to meeting prediction phase 62.

Meeting Prediction

In meeting prediction phase 62, processor 48 analyzes the current location and movement data produced at preprocessing phase 60, using prediction methods that are described further below, so as to calculate the likelihood of a future meeting of members of a group of interest. Processor 48 also indicates one or more probable locations of each predicted meeting.

In some embodiments, processor 48 may determine the probable meeting location based on POIs that are obtained from the targets' location profiles. For example, consider a scenario in which the location profile of a given target indicates that the target frequents a given restaurant at a certain time-of-day. If processor 48 detects a possible meeting involving this target in the vicinity of this restaurant, the processor may point to the restaurant as a likely exact location of the meeting.

For a given predicted meeting, the output of phase usually comprises a predicted meeting record, typically comprising some or all of the following data:

(1) A list of expected meeting participants. The participants typically comprise some or all members of a given group of interest.

(2) An estimated likelihood of the predicted meeting. This data may be expressed as mathematical probability, which is a number within the range between zero and one. Alternatively, this data may be expressed in any other suitable format, such as "low/medium/high probability."

(3) A time range at which the meeting is expected to occur.

(4) An expected geographic area of the meeting. This data may be expressed, for example, as a two- or three-dimensional vector indicating the coordinates of the center of the probable area and a radius around the central point.

The meeting events reported by processor 48 may be presented to operators 52 in any suitable format, e.g., a tabular display of the predicted meetings or a graphic display over an electronic map.

Post-Processing

In some scenarios, all of the predicted meeting records produced in meeting prediction phase 62 are presented to operators 52. In other cases, for example when the rate of the predicted meeting records is high, processor 48 post-processes the records before presentation.

Post-processing techniques may comprise, for example, filtering the predicted meetings according to filtering criteria and presenting only meetings matching the criteria. For example, processor 48 may set a certain likelihood threshold and present only predicted meetings whose likelihood exceeds the threshold. As another example, processor 48 may present only predicted meetings that are expected to occur in a pre-specified sensitive area or during a pre-specified sensitive time interval, for example specific hours, specific days of the week, specific days of the month, or specific dates. It may also be useful to apply combined criteria, for example to lower the likelihood threshold during sensitive times, or to define sensitive areas in a time-dependent manner.

Additionally or alternatively, post-processing techniques may comprise, for example, prioritizing the predicted meetings in accordance with certain criteria, and presenting the meetings according to their priorities.

Further additionally or alternatively, post-processing techniques may comprise, for example, identifying POIs within the geographic area in which the meeting is expected to take place, and presenting these POIs together with the predicted meeting. The existence and nature of the POIs may also affect the filtering process described above and the responsive actions described below.

As yet another example, post-processing techniques may comprise, for example, invoking various kinds of responsive actions, such as issuing an alarm according to triggering criteria.

Meeting Predicting Methods

Figure 3:
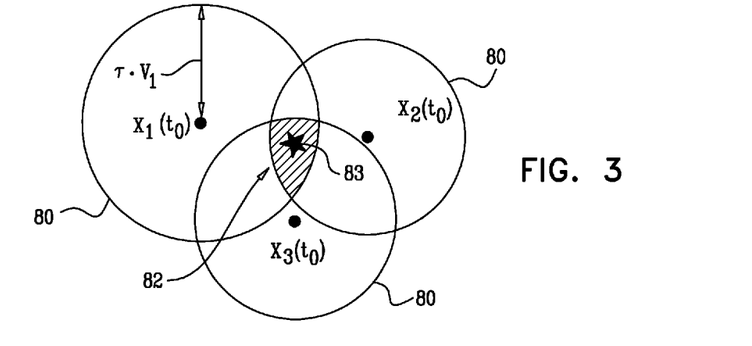
FIGS. 3-5 are diagrams that schematically illustrate meeting prediction methods, in accordance with embodiments that are described herein.
Figure 4:
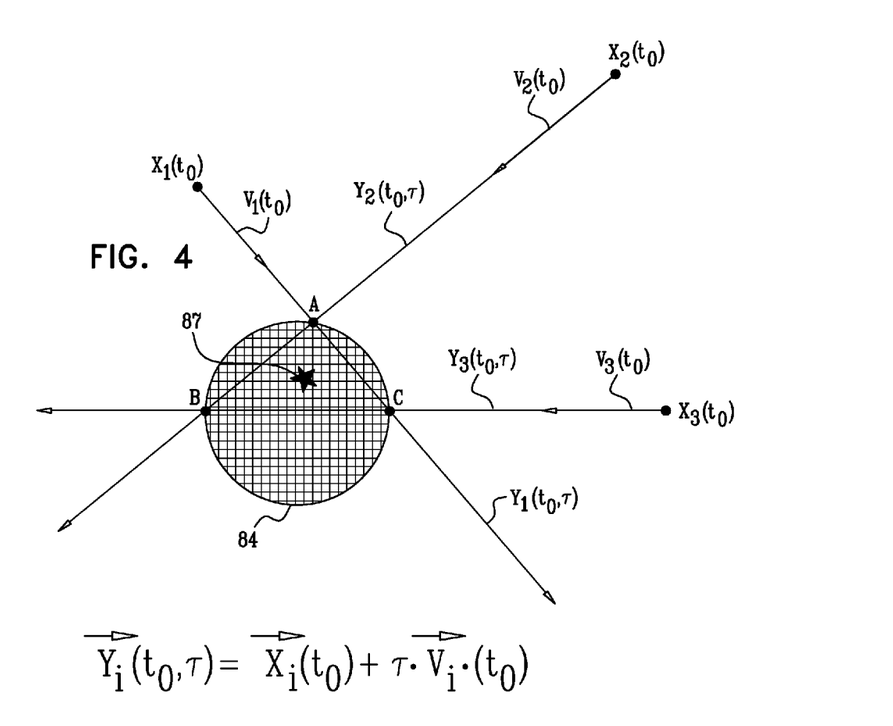
Figure 5:
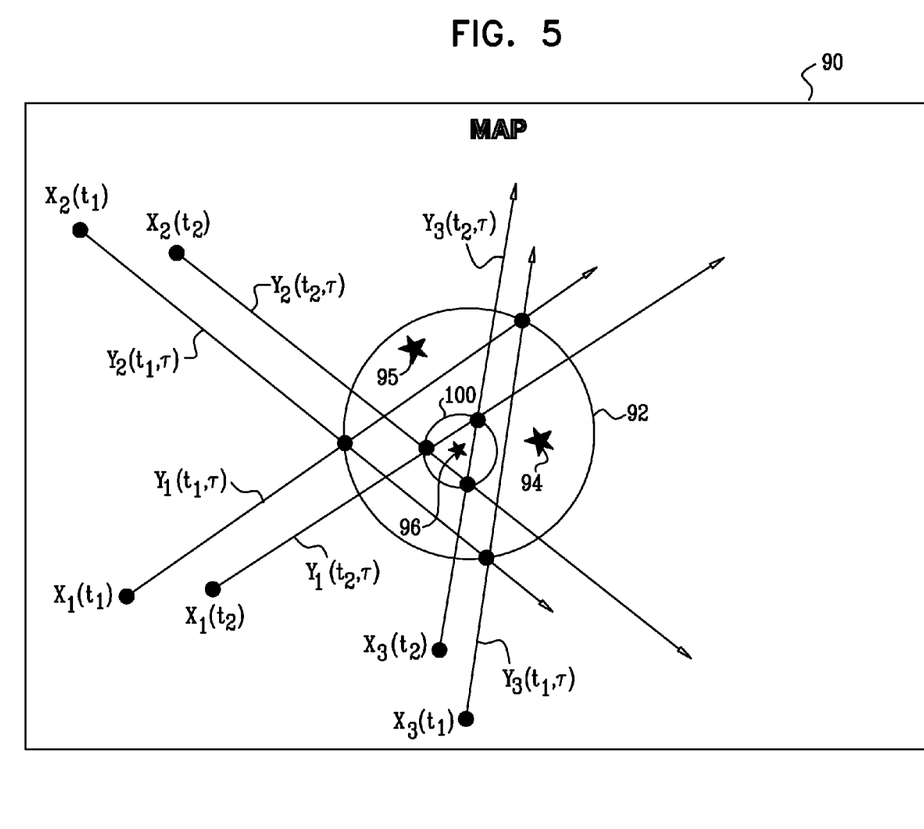

FIGS. 3-5 are diagrams that schematically illustrate example methods for meeting prediction, according to embodiments that are described herein.

In FIG. 3, the locations of three targets belonging to a given group of interest at a current time are represented by three points denoted $X_1(t_0)$, $X_2(t_0)$ and $X_3(t_0)$, respectively. Assume, for example, that target i (i=1, 2, 3) can be regarded as having a maximum absolute velocity of $V_i$ meters/second. According to this assumption, the possible location of target i after $\tau$ seconds lies within a circle 80, which is centered at $X_i(t_0)$, and whose radius is $\tau \cdot V_i$ meters. In the example of FIG. 3, the three circles overlap at a region 82. The overlap indicates that a future meeting of the three targets within $\tau$ seconds from the current time is a probable event, and that likely locations for the future meeting lie within region 82.

Additionally, in the example of FIG. 3, a POI 83, which is associated with at least one of the three targets, lies within region 82. For example, POI 83 may be a restaurant frequently visited by one of the three targets. In this example, the existence of POI 83 within region 82 increases the probability of the future meeting, and suggests a specific potential location for the anticipated meeting.

The above process can be improved by considering the direction of movement of the targets. For example, the probability of the future meeting is typically higher if the targets move toward region 82, and is lower if they move in other directions.

In FIG. 4, trajectories $Y_i(t_0, \tau)$, i=1, 2, 3, indicate the expected courses of the three respective targets. Trajectory $Y_i(t_0, \tau) = X_i(t_0) + \tau \cdot V_i(t_0)$ indicates the probable location of target i at $\tau$ seconds from current time $t_0$, wherein $X_i(t_0)$ denotes the current location of the target, and $V_i(t_0)$ denotes the current velocity of the target. As noted above, $X_i$ and $V_i$ are vectors having two or three dimensions. In the example of FIG. 4, each pair of trajectories $X_i(t_0, \tau)$ intersects, and the three intersection points (denoted A, B and C) are relatively close to each other. This close intersection indicates that a future meeting of the three targets is a probable event, and that the likely locations for such meeting lie within a circle 84, which surrounds triangle $\triangle ABC$.

Furthermore, the radius of circle 84 (denoted R) provides an indication of the probability of the future meeting. A smaller value of R typically corresponds to a higher meeting probability, and vice versa. For example, the probability may be calculated by $Pr = F(1/R)$, wherein F is a suitable monotonically-increasing function.

Additionally or alternatively, the probability of a future meeting can be evaluated based on the existence of potential POIs within the expected region of the future meeting. For example, consider POI 83 in FIG. 3, which lies within region 82, or a POI 87 in FIG. 4, which resides within circle 84. In such cases, processor 48 typically assigns a higher probability to the anticipated meeting, based on the existence of potential POIs within the expected region of the meeting. Additionally, processor 48 may indicate the POIs as potential specific locations for the anticipated meeting.

In some embodiments, the probability of a future meeting may depend on the consistency of the prediction over time. For example, the confidence level of a certain future meeting can be increased if the indication of the meeting is persistent over time, as will be illustrated in FIG. 5 below.

In the example of FIG. 5, $X_i(t_1)$ and $Y_i(t_1, \tau)$ respectively indicate the locations and the expected courses of three targets i=1, 2, 3, at time $t_1$. The information in FIG. 5 is presented over a map 90. A surrounding circle 92 indicates a probable region of a future meeting, as anticipated at time $t_1$, and POIs 94-96 lie within circle 92. At time $t_1$, processor 48 indicates POIs 94-96 as potential specific locations for the anticipated meeting.

FIG. 5 further presents another set of locations $X_i(t_2)$, expected courses $Y_i(t_2)$, and a surrounding circle 100, as all of which are calculated at time $t_2$ ($t_2 > t_1$). As can be seen in the figure, the meeting prediction develops with time so as to converge from circle 92 (at time t1) to circle 100 (at time $t_2 > t_1$). Since circle 100 is smaller than circle 92, and since POI 96 lies within both circles, processor 48 may assign a higher probability for a future meeting within circle 100, and more specifically at POI 96. POIs 94 and 95, which were initially contained in circle 92 but fell out of circle 100, are typically assigned lower probabilities.

Although the embodiments described herein mainly address computation of meeting predicting of mobile network users, the principles of the present disclosure can also be used for other applications. For example, the principles of the present disclosure can be used with other location sources, which are not necessarily related to a wireless communication network (e.g., GPS or GALILEO systems).

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A method executable on a monitoring center system which comprises an interface for communication with a wireless communication network and a processor, the method comprising:

identifying, by the monitoring center system, relationships among multiple wireless communication terminals based on communications within a wireless communication network;

receiving, by the monitoring center system, location records each associated with a respective wireless communication terminal of the multiple wireless communication terminals, wherein each location record comprises an identity number identifying the respective wireless communication terminal and a vector having two to three dimensions which indicates the current geographic location of the respective wireless communication terminal;

identifying, by the monitoring center system, a subgroup of the multiple wireless communication terminals, whose meetings between members of the subgroup are of interest to operators of the monitoring center system based on the identified relationships;

analyzing the location records of the wireless communication terminals in the subgroup and producing, for each wireless communication terminal in the subgroup, current location data and current movement data, wherein the data comprises a two- or three-dimensional vector representing two or three Cartesian coordinates of the wireless communication terminals;

predicting, by the monitoring center system, a likelihood of a future meeting occurring among the respective users of the wireless communication terminals in the subgroup by determining future location coordinates for each wireless communication terminal in the subgroup which indicate where each of the wireless communications terminals in the subgroup is expected to be located at a given time in accordance with its respective current location data and respective current movement data, wherein the future location coordinates define a geographic convergence area that indicates the likelihood of the future meeting occurring based on the relative size of the defined geographic convergence area; and producing, by the monitoring center system, predicted meeting records for each predicted meeting and presenting the predicted meeting records to the operators of the monitoring center system.

2. The method according to claim 1, wherein the location information received was produced by the wireless communication network.

3. The method according to claim 1, further comprising calculating a likely location of the future meeting.

4. The method according to claim 3, wherein calculating the likely location comprises obtaining a Point-of-Interest (POI) related to one or more of the users from a characteristic location profile of the one or more users, identifying that the POI is within the defined convergence area, and indicating the POI as the likely location of the future meeting.

5. The method according to claim 1, wherein each of the predicted meeting records comprises the expected meeting participants, the likelihood of the future meeting occurring, a time range at which the future meeting is expected to occur, and the likely location of the predicted meeting.

6. A monitoring center system, comprising:

an interface that receives location records each associated with a respective wireless communication terminal of multiple wireless communication terminals that communicate within a wireless communication network, wherein each location record comprises an identity number identifying the respective wireless communication terminal and a vector having two or three dimensions which indicates the current geographic location of the respective wireless communication terminal; and a processor that:

identifies relationships among the multiple wireless communication terminals based on communications within a wireless communication network;

identifies a subgroup of the multiple wireless communication terminals, whose meetings between members of the subgroup are of interest to operators of the monitoring center system based on the identified relationships;

analyzes the location records of the wireless communication terminals in the subgroup and produces, for each wireless communication terminal in the subgroup, current location data and current movement data, wherein the data comprises a two- or three-dimensional vector representing two or three Cartesian coordinates of the wireless communication terminals;

predicts a likelihood of a future meeting occurring among the respective users of the wireless communication terminals in the subgroup and a likely location for the predicted future meetings, by determining future location coordinates for each wireless communication terminal in the subgroup which indicates where each wireless communications terminal in the subgroup is expected to be located at a given time in accordance with its respective current location data and respective current movement data, wherein the future location coordinates define a geographic convergence area that indicates the likelihood of the future meeting occurring based on the relative size of the defined geographic convergence area, and wherein the likely location of the predicted future meeting lies within the defined geographic convergence area; and produces predicted meeting records for each predicted meeting and presents the predicted meeting records to the operators of the monitoring center system.

7. The monitory center system according to claim 6, wherein the processor calculates a likely location of the future meeting.

8. The monitoring center system according to claim 7, wherein the processor calculates the likely location of the future meeting by at least obtaining a Point-of-Interest (POI) related to one or more of the users from a characteristic location profile of the one or more users, identifying whether the POI is within the defined geographic convergence area, and indicating the POI as the likely location of the future meeting.

9. The method according to claim 1, wherein each of the predicted meeting records comprises the expected meeting participants, the likelihood of the future meeting occurring, a time range at which the future meeting is expected to occur, and the likely location of the predicted meeting.

\* \* \* \* \*